July 20, 1926.
A. S. BERTELS
1,593,380
TESTING DEVICE FOR TELEPHONE EXCHANGE SYSTEMS
Filed Oct. 6, 1923
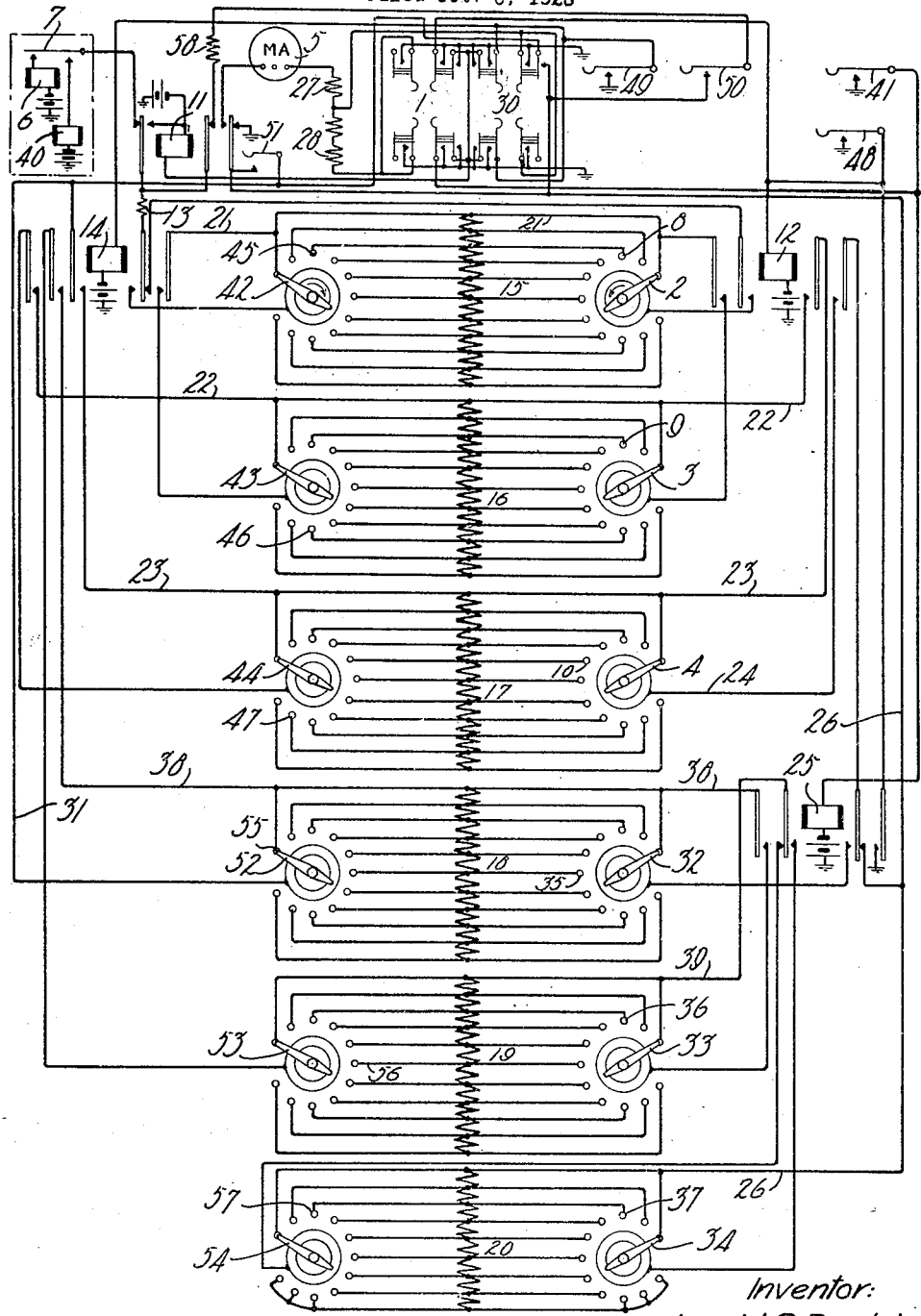
Inventor:
Arnold S. Bertels.
by R. C. Hapgood
Att'y Patented July 20, 1926.

1,593,380

UNITED STATES PATENT OFFICE.

ARNOLD S. BERTELS, OF TENAFLY, NEW JERSEY, ASSIGNOR TO WESTERN ELECTRIC COMPANY, INCORPORATED, OF NEW YORK, N. Y., A CORPORATION OF NEW YORK.

TESTING DEVICE FOR TELEPHONE-EXCHANGE SYSTEMS.

Application filed October 6, 1923. Serial No. 666,955.

This invention relates to a testing device for telephone exchange systems and more particularly to a rheostat for adjusting the values of current applied to apparatus under test.

In my Patent No. 1,522,856, issued January 13, 1925 I have disclosed a testing device for testing relay call indicator trunk circuits and control circuits and have described therein the manner in which the testing device is employed for testing the adjustment of the supervisory and ringing trip relays of such trunk circuits. In testing a ringing trip relay, for example, a rheostat of the testing device is first adjusted until a milliammeter indicates the proper operating current flowing through the relay under test and then a second rheostat is adjusted until the milliammeter indicates current flowing through the relay of such value as should cause the release of the relay. Following the test of the ringing trip relay, the rheostats are readjusted and the supervisory relay is then tested for operation and release in the same manner.

It is desirable to enable the test operator to proceed with the tests of the relays of a trunk circuit without necessitating the readjustment of the rheostats following the test of the ringing trip relay and before proceeding with the test of the supervisory relay. This is accomplished according to the present invention through the provision of four rheostats, two for controlling the test values of current for testing ringing trip relays and the other two for controlling the values of current for testing supervisory relays. Each of these rheostats comprises a plurality of adjustable arms and associated bank contacts. The four rheostats are arranged in pairs so that the corresponding adjustable arms of a pair co-operate with bank contacts connected with a series of resistance elements common thereto. In this manner, the number of resistance elements necessary for the four rheostats is reduced by half, thus materially reducing the cost and simplifying the construction thereof. In addition means are provided for adjusting the rheostats prior to the initiation of tests of relays.

It is therefore an object of the present invention to provide an improved current adjusting means which is simple in construction and efficient in operation.

Specifically, it is an object of the invention to provide in a system of the character described, a plurality of current adjusting means which employ resistance elements common thereto and to provide means for adjusting the current adjusting means prior to the initiation of their employment in testing.

The drawing shows at the left of the single figure two rheostats each having three adjustable arms for regulating the operating and release values of current to be applied to supervisory relays to be tested and, at the right of the figure, two similar rheostats for adjusting the operating and release values of current to be applied to ringing trip relays to be tested. In the upper portion of the figure keys are shown for associating the several rheostats with the milliammeter. Relays to be tested are shown in the small dotted rectangle in the upper left corner of the figure.

To simplify the disclosure, only portions of the testing device with which the rheostats function have been disclosed, the circuits of the relays under test being disclosed as extending directly to the rheostat circuit. For a more detailed disclosure of the manner in which this invention would be employed in actual service, reference may be had to my patent hereinbefore referred to. While the invention has been disclosed as specifically applicable to the testing of relays, it is obvious that the invention is of general applicability and is limited only in scope by the language of the appended claims.

It is thought that the invention will be best understood from a consideration of the following detailed description of the circuits disclosed and the manner in which they function. To prepare the circuits for testing, the test operator first operates key 1 to its upper position and adjusts the arms 2, 3 and 4 of the first rheostat until the milliammeter 5 indicates a current value which should be sufficient to operate the trip relay such as disclosed at 6. It will be assumed that to obtain the proper value of operating current, the arm 2 is moved to the second contact 8 of its bank, the arm 3 is moved to the third contact 9 of its bank and the arm 4 to the fourth contact 10 of its bank. The arm 2 thus introduces two resistance elements of one ohm each, the arm 3, three elements of 10 ohms each and the arm 4, four elements of 100 ohms each or a total resistance of 432 ohms.

Upon the operation of key 1 to its upper position, circuits are established through right contacts of the keys for relays 11 and 12, relay 11 disconnecting the bus bar 7, and the two relays cooperating to connect the milliammeter 5 in series with the rheostat arms 2, 3 and 4. The circuit thus established through the milliammeter 5 may be traced from battery, left armature and front contact of relay 11, resistance 13, inner right armature and back contact of relay 14, inner left armature and back contact of relay 14, inner left armature and front contact of relay 12, arm 2, contact 8, the two upper resistance elements of the series 15, conductor 21, the outer left armature and front contact of relay 12, arm 3, contact 9, the three upper resistance elements of the series 16, conductor 22, the inner right armature and front contact of relay 12, conductor 23, the four upper resistance elements of series 17, contact 10, arm 4, conductor 24, the outer right armature and front contact of relay 12, the inner right armature and back contact of relay 25, conductor 26, the outer right armature and front contact of relay 11, milliammeter 5, resistance elements 27 and 28, which elements are of the same resistance respectively as the repeating coil and trip relay of the standard relay call indicator trunk circuit, thence to ground at the upper left contact of key 1.

Having adjusted the arms 2, 3 and 4 to positions as assumed in which the milliammeter 5 indicates the correct current value for operating a tripping relay to be tested, the key 1 is operated to its lower position, in which the relay 11 is operated as before. Relay 25 is also operated, in turn establishing an obvious circuit for relay 12. With relays 11, 12 and 25 operated and relay 14 unoperated, a circuit is established serially through the milliammeter 5, the arms 2, 3 and 4, in their adjusted positions, and the arms 32, 33 and 34 of the second rheostat. The test operator then adjusts the arms 32, 33 and 34 until the milliammeter indicates a current flowing of the prescribed value for "non-operate" or release test of a tripping relay. It will be assumed that to obtain this current value, a total of 1250 ohms additional resistance is cut into the milliammeter circuit previously traced, by the rheostat arms 32, 33 and 34, and that, therefore, the arm 32 is set upon contact 35 to include five 10 ohm resistance elements of the series 18, the arm 33 is set upon contact 36 to include two 100 ohm elements of series 19 and the arm 34 is set upon contact 37 to include one 1000 ohm element of series 20.

The circuit through the milliammeter 5 may now be traced as before from battery at relay 11, arms 2, 3 and 4 in series, conductor 24, the outer right armature and front contact of relay 12, the inner right armature and front contact of relay 25, arm 32, contact 35, the four upper resistance elements of series 18, conductor 38, the outer left armature and front contact of relay 25, arm 33, contact 36, the upper two resistance elements of series 19, conductor 39, the inner left armature and front contact of relay 25, arm 34, contact 37, the upper resistance element of series 20, conductor 26 thence as traced through the milliammeter 5, resistance elements 27 and 28 to ground at the lower left contact of key 1.

Following the adjustment of arms 32, 33 and 34 to positions as assumed, the resistance of the circuit through the milliammeter and the arms 2, 3 and 4 is increased to such an amount as to obtain the proper releasing current value indication on the milliammeter 5. The key 1 is thereupon operated to its intermediate position releasing relays 11, 12 and 25.

The key 30 is now operated into its upper position in which the circuit of relay 11 is again established and an additional circuit is closed from battery, relay 14, to ground at the innermost upper left spring of key 30. With relays 11 and 14 operated, a circuit is established serially through the milliammeter 5 and the arms 42, 43 and 44 of the third rheostat. The arms of this rheostat are then adjusted until the milliammeter 5 indicates the prescribed operating value of current for the supervisory relay to be tested. It will be assumed that to obtain this value of supervisory operating current, a total of 982 ohms resistance is included in the circuit of the milliammeter through the setting of the rheostat, and that, therefore, the arm 42 is set on contact 45 to include two 1 ohm resistance elements of series 15, arm 43 is set on contact 46 to include eight 10 ohm elements of series 16 and that arm 44 is set on contact 47, to include nine 100 ohm elements of series 17.

The circuit through the milliammeter 5 may now be traced from battery, left armature and front contact to relay 11, resistance 13, inner right armature and front contact of relay 14, arm 42, contact 45, upper two resistance elements of series 15, conductor 21, outer right armature and front contact of relay 14, arm 43, contact 46, upper eight resistance elements of series 16, conductor 22, outer left armature and contact of relay 14, arm 44, contact 47, upper nine resistance elements of series 17, conductor 23, innermost left armature and contact of relay 14, outer right contact of key 30 in its upper closed position, outer right armature and front contact of relay 11, milliammeter 5, resistance element 27 to ground at a contact of key 30.

The test operator now proceeds to set the fourth rheostat to determine the prescribed release value of current for testing the supervisory relay and first operates key 30 to its lower position, relays 11 and 14 again operating. With the upper outer right contact of key 30 now open, the circuit previously traced through the arms 42, 43 and 44 of the third rheostat does not extend directly to the milliammeter 5 but now extends to the inner left armature of relay 14, and serially through the arms 52, 53 and 54 of the fourth rheostat. It will now be assumed that, in addition to the resistance before included in the circuit of milliammeter 5 for determining the operating value of current for testing a supervisory relay, it is necessary to add 2,500 ohms resistance and that, for that purpose, the arm 53 is set on contact 56 including five 100 ohm resistance elements of series 19 and that the arm 54 is set on contact 57 including two 1000 ohm resistance elements of series 20.

The circuit through milliammeter 5 may now be traced as previously described from battery at relay 11, through the arms 42, 43 and 44, and resistance elements of series 15, 16 and 17, thence to the inner left armature and contact of relay 14, conductor 31, arm 52 and the normal contact 55, conductor 38, the intermediate left armature and contact of relay 14, arm 53, contact 56, the upper five resistance elements of series 19, conductor 39, the inner left armature and back contact of relay 25, arm 54, contact 57, the upper two resistance elements of series 20, conductor 26, the outer right armature and front contact of relay 11, milliammeter 5, resistance element 27 to ground at the lower left spring of key 30. Following the setting of the fourth rheostat, the test operator restores the key 30 to its intermediate position.

The test operator has now completed the setting of the rheostats and may proceed with the test of the relays. It will first be assumed that the test set with which the rheostat circuit is associated has been connected with a trunk circuit and that a ringing trip relay 6 thereof is to be tested, the connection to this relay being diagrammatically illustrated in the upper left portion of the figure. The test operator upon depressing the "non-operating" or release key 41 now establishes an obvious circuit for relay 25 which in turn closes a circuit for relay 12. A circuit is thereupon established from battery, through the relay 6, bus bar 7, left armature and back contact of relay 11, resistance 13, inner right armature and back contact of relay 14, inner left armature and front contact of relay 12, thence as previously traced in series through the arms 2, 3 and 4 in their previously adjusted positions, resistance elements of series 15, 16 and 17, front contacts and armatures of relay 12, arms 32, 33 and 34 in their previously adjusted positions, resistance elements of series 18, 19 and 20, front contacts of relay 25, conductor 26, to ground at the outer right armature and back contact of relay 11. The current flowing through the relay 6 is of such a value that the relay should not operate if in proper adjustment.

Following the observation of the relay 6, under the influence of current of a non-operating or release value, the key 41 is released permitting the deenergization of relays 12 and 25. The key 48 is then depressed for applying current of the prescribed operating value to the winding of relay 6 through the operation of relay 12. Current flows through relay 6 over the circuit previously traced extending through the front contacts of relay 12, arms 2, 3, and 4 in their previously adjusted positions and resistance elements of series 15, 16 and 17. Thus, by alternately operating keys 48 and 41, the relay under observation is caused to energize and deenergize alternately.

To test a supervisory relay 40, the relay 40 is connected to the bus bar in place of the relay 6 and the test operator first operates key 49 and while holding it depressed operates key 51. Upon the operation of key 49, relay 14 energizes in an obvious circuit. Upon each depression of key 51, current flows from battery through relay 40, the left armature and back contact of relay 11, resistance 13, thence in series through arms 42, 43 and 44 in their adjusted positions, resistance elements of series 15, 16 and 17, front contacts of relay 14, contact of key 51 to ground at the outer right armature and back contact of relay 11. Upon each release of key 51, current flows through relay 40, over the left armature and back contact of relay 11, resistance 13, the inner right armature and front contact of relay 14, thence in series through arms 42, 43 and 44 and resistance elements of series 15, 16 and 17 as previously traced, the inner left armature and front contact of relay 14, conductor 31, thence in series through arms 52, 53 and 54 in their adjusted positions, resistance elements of series 18, 19 and 20, conductor 26 to ground at the outer right armature and back contact of relay 11. Due to the inclusion of the additional resistance cut into the circuit of the relay over the arms 52, 53 and 54, relay 40 should release upon each release of key 51. Thus, relay 40 if in proper adjustment, should energize upon each depression of key 51 and release upon each release thereof.

If the test operator desires to magnetically saturate the supervisory relay, current of greater strength may be applied thereto by the depression of key 50, current flowing through the relay directly from battery over the left armature and back contact and inner right armature and back contact of relay 11, resistance 58, key 50, to ground at the outer right armature and back contact of relay 11.

What is claimed is:

1. In a testing mechanism, a device to be tested, a source of current, means for adjusting current to the prescribed operating and non-operating values for said device comprising a milliammeter, adjustable current varying means and adjusting keys, and a plurality of test keys for applying said source of current to said device through said adjusted current varying means.

2. In a testing mechanism, a device to be tested, a source of current, means for adjusting current to the prescribed operating and non-operating values for said device comprising a milliammeter, a plurality of serially arranged adjustable current varying means and adjusting keys, and a plurality of test keys for applying said source of current to said device through said adjusted current varying means.

3. In a testing device, a relay to be tested, a source of current, means for adjusting current to the prescribed operating and non-operating or release values for said relay comprising a milliammeter, a plurality of serially arranged adjustable current varying means, and adjusting keys, and a test key for applying said source of current to said relay through a portion of said adjusted current varying means, and a second test key for applying said source of current through all of said adjusted current varying means, whereby said relay is tested for operation and then for release.

4. In a testing device, a pair of relays to be tested, a source of current, means for adjusting current to the prescribed operating and non-operating or release values for said relays comprising a milliammeter, a plurality of groups of serially arranged adjustable current varying means and keys for associating said current varying means by groups with said milliammeter, and a plurality of test keys for applying said source of current to said relays individually through said adjusted current varying means, whereby said relays are tested for operation and for release.

5. In a testing device, a pair of relays to be tested, a source of current, means for adjusting current to the prescribed operating and non-operating or release values for said relays comprising a milliammeter, a plurality of groups of serially arranged adjustable current varying means, and keys for associating said current varying means by groups with said milliammeter, means for applying said source of current to one of said relays through either one or two groups of said adjusted current varying means for operating or releasing said relays, and means for applying said source to the other of said relays through one of two other groups of adjusted current varying means for operating or releasing said other relay.

6. In a testing device, a pair of relays to be tested, a source of current, means for adjusting current to the prescribed operating and non-operating or releasing values for said relays comprising a plurality of rheostats arranged in pairs, each rheostat having an adjustable arm and associated bank of contacts, series of resistance elements common to the bank contacts of paired rheostats, and keys for connecting said source of current through said adjusted rheostats with said relays.

7. In a testing device, a pair of relays of different characteristics to be tested, a source of current, two rheostats for adjusting current to the prescribed operating and non-operating or releasing values respectively for one of said relays, two similar rheostats for adjusting current to the prescribed operating and non-operating values respectively for the other of said relays, each rheostat having an adjustable arm and associated bank of contacts, two series of resistance elements for said rheostats, one series being common to the banks of the two rheostats which control non-operating values of current for said two relays, the second series being common to the banks of the two rheostats which control non-operating values of current for said two relays, and keys for connecting said source of current through said rheostats with said relays.

8. In a testing device, a pair of relays of different characteristics to be tested, a source of current, two rheostats for adjusting current to the prescribed operating and non-operating or releasing values respectively for one of said relays, two similar rheostats for adjusting current to the prescribed operating and non-operating values for the other of said relays, each rheostat having a plurality of serially connected adjustable arms and associated banks of contacts, two series of resistance elements for said rheostats, one series being common to the banks of the two rheostats which control operating values of current for said two relays, the second series being common to the banks of the two rheostats which control non-operating values of current for said two relays, and keys for connecting said source of current through said rheostats with said relays.

9. In a testing mechanism, a resistance device comprising a plurality of series of resistance elements, a plurality of banks of contacts multiplied to each of said series, a contact arm for cooperation with each bank of contacts, and means for connecting resistance elements of each series in series relation and in different combinations through said multiplied banks of contacts and cooperating arms.

10. In a testing mechanism, a resistance device comprising a plurality of series of resistance elements, a plurality of banks of contacts multiplied to each of said series, a contact arm for cooperation with each bank of contacts, and relays for connecting resistance elements of each series in series relation and in different combinations through said multiplied banks of contacts and cooperating arms.

In witness whereof, I hereunto subscribe my name this 27th day of September A. D., 1923.

ARNOLD S. BERTELS.